2 Sheets—Sheet 1.
McNEIL & CADWELL, Jr.
Railroad Car Heater.
No. 3,509. Reissued June 22, 1869.
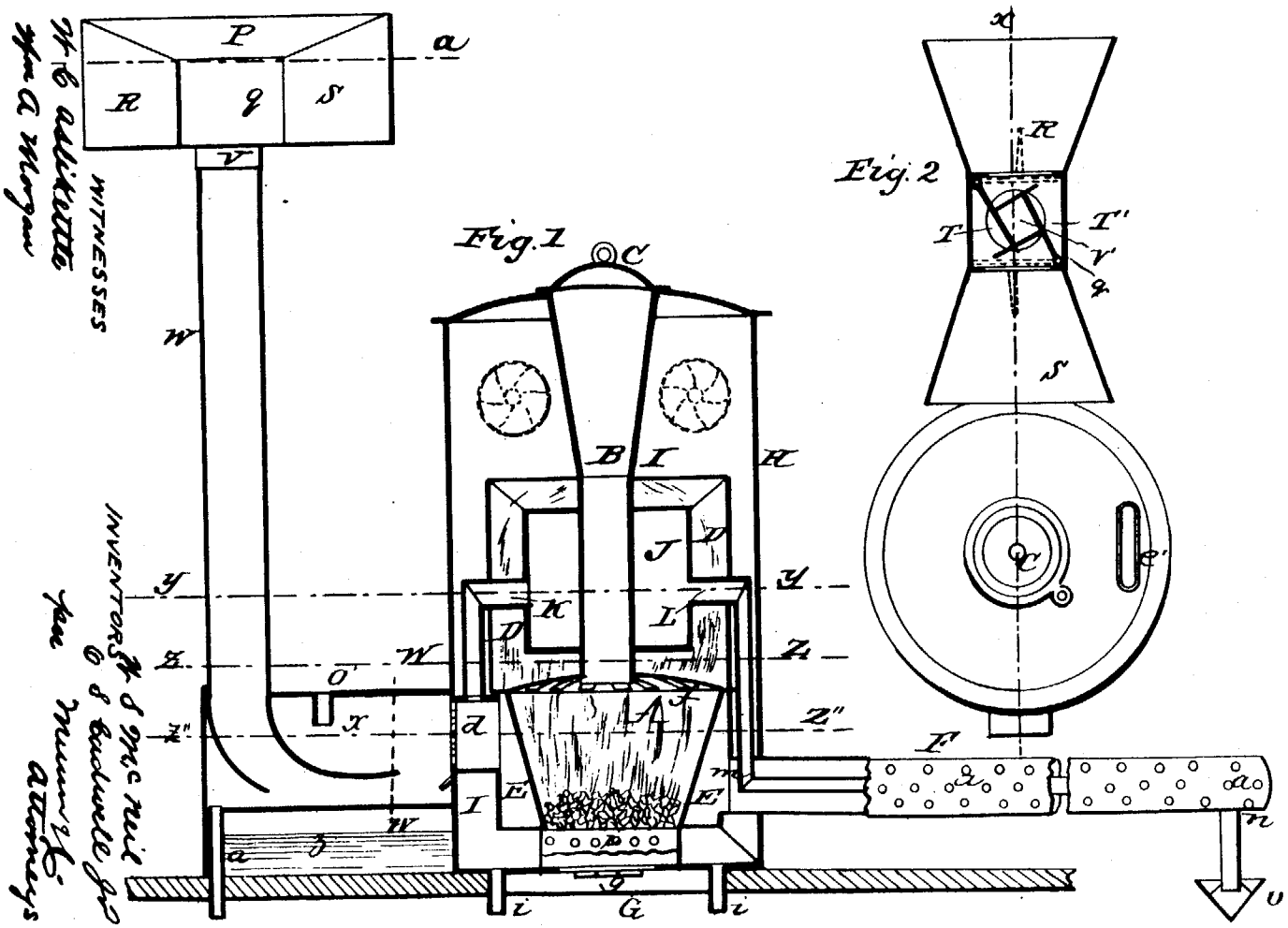

McNEIL & CADWELL, Jr.
2 Sheets—Sheet 2.
Railroad Car Heater.
No. 3,509.
Reissued June 22, 1869.
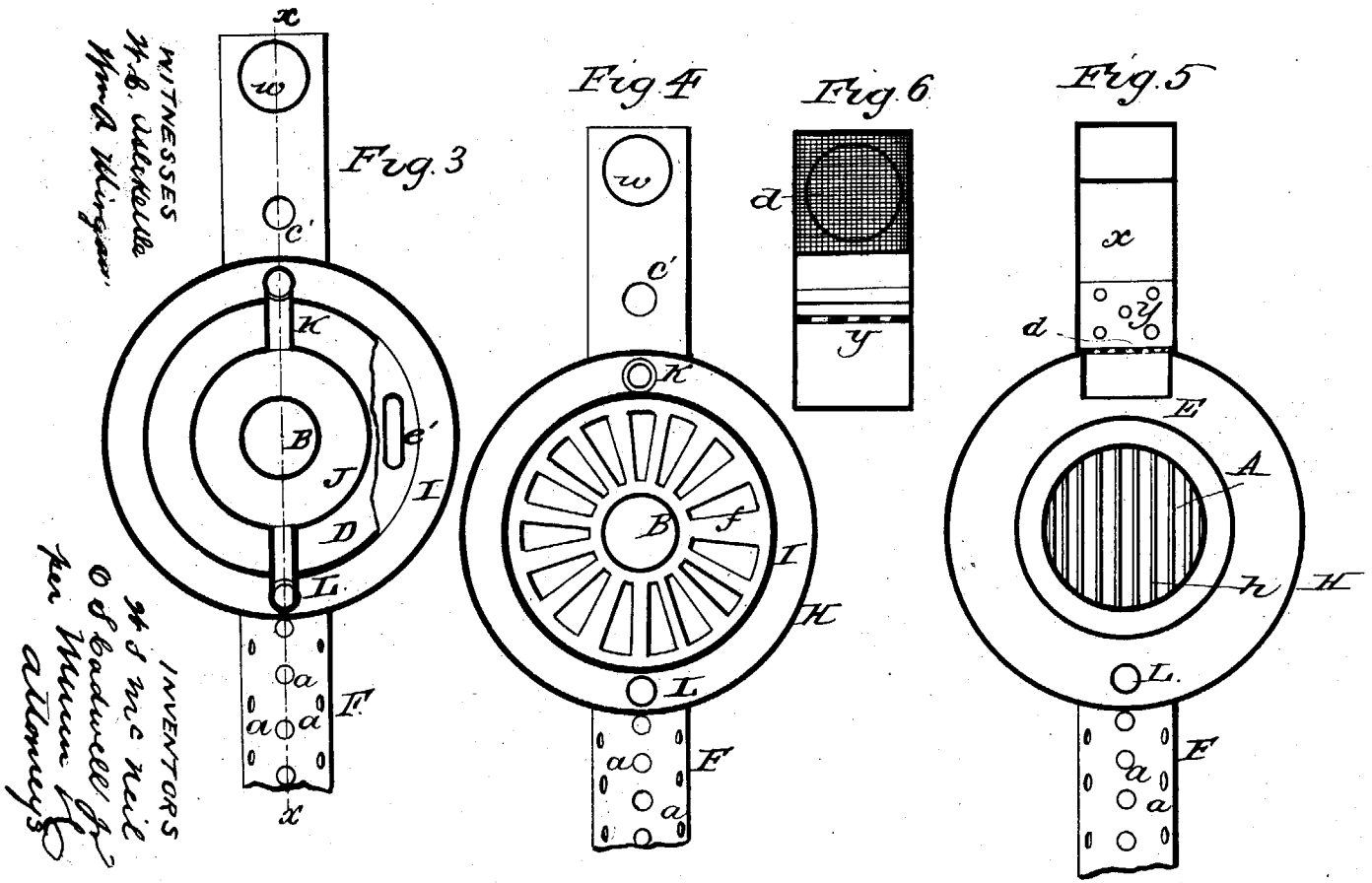
WITNESSES
H. B. Ashkettle
Wm A. Wingar
INVENTORS
H S McNeil
O S Cadwell Jr
per Munn & Co
attorneys
N. PETERS. Photo-Lithographer. Washington. D. C.

United States Patent Office.

AMERICAN CAR-HEATING COMPANY, OF NEW YORK, N. Y., ASSIGNEE, BY MESNE ASSIGNMENTS, OF W. S. McNEIL AND O. S. CADWELL, JR.

*Letters Patent No.* 81,392, *dated August* 25, 1868; *reissue No.* 3,509, *dated June* 22, 1869.

IMPROVEMENT IN RAILROAD-CAR HEATERS.

The Schedule referred to in these Letters Patent and making part of the same.

*To whom it may concern:*

Be it known that W. S. McNeil and O. S. Cadwell, Jr., of Springfield, in the county of Hampden, and State of Massachusetts, have invented a new and improved Railroad-Car Heater; and the following is hereby declared to be a full, clear, and exact description of the same, reference being had to the accompanying drawings, forming part of this specification.

The object of this invention is to combine in one apparatus, occupying no more space than an ordinary stove, the functions of a ventilator, or both a heater and ventilator, under such an arrangement that the air, whether heated or not, shall be purified, or deprived of all noxious gases and impurities before being discharged into the car, and further, so that the car, whether in motion or at rest, may be supplied with air, the means for supplying or both supplying and heating the air, when the car is in motion, being independent of those which subserve the same purpose when the car is at rest. To this effect, The invention consists—

1. In a car-heating and ventilating apparatus, in which the following elements are combined:

(1.) Means for taking in air when the car is in motion.

(2.) Means for distributing or both heating and distributing such air through the car, according as it is desired to ventilate or both heat and ventilate the car.

(3.) Means for taking in air when the car is at rest.

(4.) Means for heating and distributing such air through the car.

2. In the combination, with the above-named elements, of an air-purifying apparatus, for removing the impurities from the air taken in from the exterior of the moving car.

The invention further consists in minor features of construction and relative arrangement of the different parts of the apparatus, which, however, can best be explained by reference to the accompanying drawings, which will now be described, in order that the nature of the invention, and the manner in which the same is or may be carried into effect, may be more fully understood.

Figure 1 represents a longitudinal vertical section of a car-heating and ventilating apparatus, made in accordance with this invention, the section being on the line *x x*, fig. 2.

Figure 2 is a plan of the apparatus, the funnels and valves being shown in section on the line *a a*, fig 1.

Figure 3 is a horizontal section on the line *y y*, fig. 1.

Figure 4 is a horizontal section on the line *z z*, fig. 1.

Figure 5 is a horizontal section on the line *z′ z′*, fig. 1.

Figure 6 is a vertical section through the air-purifying apparatus, on the line *w w*, fig. 1.

The furnace, or fire-box A of the apparatus, is provided with a cylinder, or conduit, B, with a cover, C, through which the fuel is introduced from the top of the heater.

Beneath the fire-box, through the floor G of the car, there is a trap-door, *g*, so arranged that the ashes may be dumped on to the track, and so that by reversing the grate, upon which the fuel rests, the contents of the furnace may be dropped in the same manner.

The top of the fire-box is covered by the grating *f*, and above, and communicating with the box, is arranged the combustion-chamber D, from the top of which leads the smoke-pipe *e*.

The fire-door C should be tightly locked or clasped down, so as to prevent, in case of accident, the escape of the fuel from the fire-box.

Surrounding the fire-box is a hot-air chamber, E, which communicates, through the conduit, or opening, *d*, with the air-supply apparatus, and is connected with the pipe F, from which the heated air is discharged into the car. This discharge-pipe extends horizontally through the car, under the seats, or in any other desired or convenient position, and, in order to allow the heated air to pass into the car, it is provided with perforations *a*, which may be arranged in groups, and provided with dampers, for regulating the discharge of the heated air, if desired.

In order to utilize the heat immediately above the fire-box, and from the combustion-chamber, an annular hot-air chamber, J, communicating with the chamber E, through the pipe K, and forming, in effect, a continuation of said chamber, may be located within the combustion-chamber, or the chamber E may be continued upward in any suitable manner.

The hot air from the chamber J is discharged from the conduit L, which enters the perforated discharge-pipe F.

For the purpose of creating a draught through the heater, and warming the car when not in motion, the pipe L may pass along through the pipe F, thereby increasing the temperature of the air in the latter pipe by radiating its heat, and out from it at *n*, extending downward, with a hood on its end, as seen at *o*.

In order to furnish the requisite supply of air to the heater or to the discharge-pipe F, there is placed outside, and above the car, a double funnel, P, the two parts of which are connected by the box, or section *q*, in which the valves are located, and which rests upon the air-pipe W.

T T′ are two valves, hinged within the box *q*, and provided with wire arms *u*, as seen in the drawing, the arrangement of these parts, with relation to each other, being such that a current of air passing into the funnel S will close the valve T, and force back, or open the valve T′, so that the air entering through the latter valve will pass down through the pipe W. Should the current of air pass through the funnel R, the position of the valves will, of course, be reversed, and they are thus made to operate automatically, and to accommodate themselves to the direction in which the car moves, or to the prevailing current of air.

In order to free the air taken through the pipe W from dust and other impurities, it is passed through a purifying-apparatus before reaching the heater or the discharge-pipe F. The apparatus, in this instance, consists of an air-purifying chamber and water-tank, *x z*, provided with a perforated screen, *y*, for preventing the excessive splashing of the water, a waste-pipe, *a'*, and an opening, *c'*, through which water may be introduced. The air entering through the pipe W will be brought into contact with the water and vapor in the chamber, and will be separated and freed from dust, cinders, &c., which will sink to the bottom of the tank, and the air, before being discharged into the car, whether heated or not, will thus be purified, and rendered fit for respiration. In order to more effectually secure this result, there may be as many partitions, or deflecting-aprons placed in the purifying-chamber, for the purpose of retarding the air, as desired, and these aprons, partitions, or deflectors, as well as the interior walls of the chamber, may be covered with flannel or felting, or other porous, fibrous, or absorbent material. The motion of the car will agitate the water, so as to cause it to splash, and thoroughly saturate the lining, which, as the air passes over it, serves to assist in precipitating the cinders, dust, &c., and, for the same purpose, the air may be made to pass through one or more screens on its way to the heater or discharge-pipe, as seen at *v* and *d*, fig. 6. Thus, while the car is in motion, a continuous current of air will be forced down the pipe W, through the hot-air chamber, and into the car, which, being separated from its impurities on the way, will furnish the car with a constant supply of fresh, warm air, so that the windows may be kept closed, and that great source of cold, discomfort, and danger be avoided; or if the weather be such as not to require a fire, the apparatus may be used for ventilating-purposes only, the purified, but unheated air being discharged into the car in the same manner as before.

For the purpose, as hereinbefore indicated, of heating the car while at rest, the fire-box and combustion and hot-air chambers are surrounded by an outer casing, H, which forms an annular chamber, I, into which air is introduced, through pipes *i i*, from the outside or bottom of the car, or the air may be introduced in any other convenient or suitable manner, as, for instance, through apertures in the base of the casing, the air being taken, in such case, from within the car. In whatever manner, however, the air is supplied, as it enters and ascends through the chamber I, it is heated by contact with the heated surface of the combustion-chamber, and by the radiation therefrom, and in this state is discharged directly from the heater, through registers or orifices, indicated in red lines in fig. 1. As this portion of the apparatus is intended to be used only when the car is standing still, the air need not be passed through a purifying-apparatus, as it carries with it but little or no dust or other impurities.

It is obvious that the construction and arrangement of the different parts of the apparatus, as described, may be variously modified, and simplified, without departure from the principle of the invention as hereinbefore stated, and that instead of the double funnel and valves, there may be employed a funnel capable of being turned according to the direction in which the car moves, although the arrangement hereinbefore described is preferred in most cases; and therefor,

What is claimed as the invention of W. S. McNeil and O. S. Cadwell, Jr., is as follows:

1. A railroad-car-heating and ventilating apparatus, in which the following elements are combined, substantially as hereinbefore described, viz:

(1.) Pipes, or conduits for taking in air from the exterior of the moving car.

(2.) Means for distributing or both heating and distributing, through the car, the air received from such conduits.

(3.) Passages, or openings for taking in air when the car is at rest, and conducting it to (4.) A heating-chamber, or space, wherein such air is heated, and from which it is discharged into the body of the car, such chamber, or space being distinct from that which receives and heats the air taken in when the car is in motion.

2. The combination, with the elements named in the preceding clause, of an air-purifying apparatus, for removing the impurities from the air taken in when the car is in motion, before such air is distributed through the car.

3. The arrangement, substantially as herein described, of two separate and non-communicating annular air-heating chambers around the radiator, or heater, the one receiving air from above the car, when in motion, by means of funnels and automatic valves, and discharging it into the car through perforated pipes, as specified; the other receiving air from the base of the radiator, or heater, or from below the car when at rest, and discharging it directly from the heater; the air in both cases being heated while ascending through the heater, substantially as and for the purposes set forth.

4. The construction of the air-purifying chamber, provided with absorbent material, as specified, and its arrangement with relation to the air-supply pipe and the heater, substantially in the manner shown and described.

In testimony whereof, I, Edward Foote, president of the American Car-Heating Company, have hereunto set my hand, in the presence of two subscribing witnesses.

EDWARD FOOTE,
*President American Car-Heating Company.*

Witnesses:
Chas. H. Vibbard,
Alex. P. Fisk.